Aug. 15, 1944.  H. A. SAMER  2,356,006
BUS BAR SUPPORTING CLAMP
Filed April 13, 1943
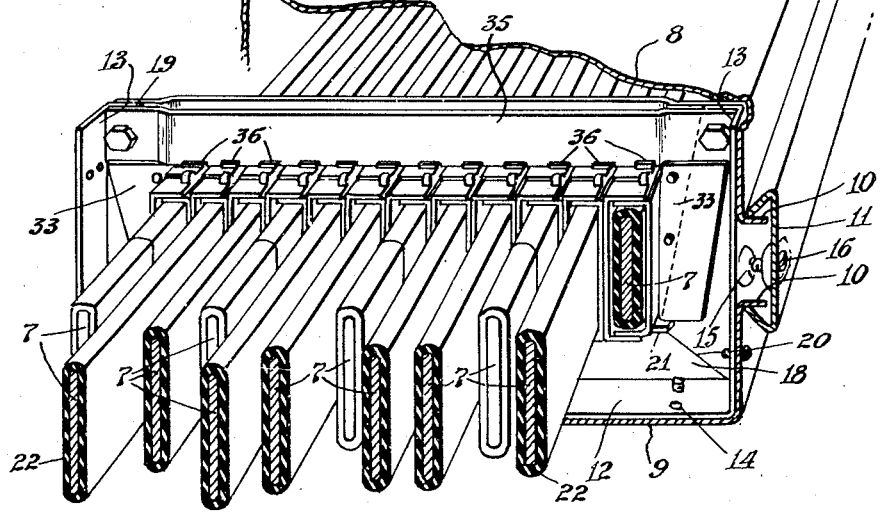
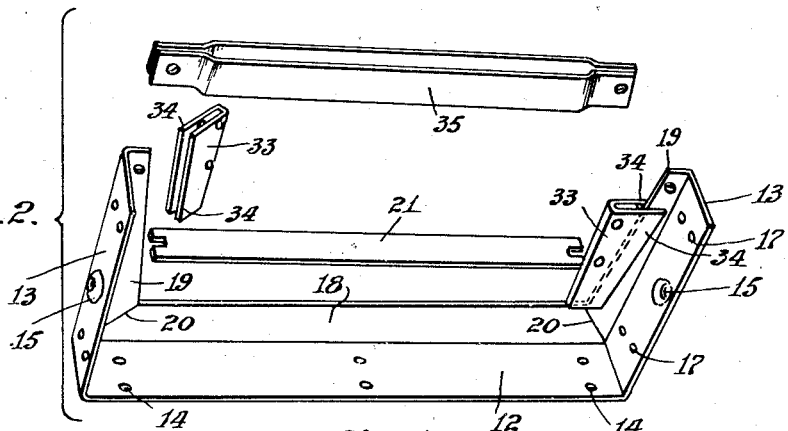
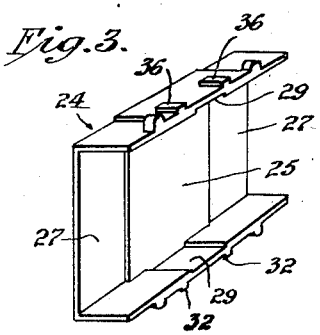 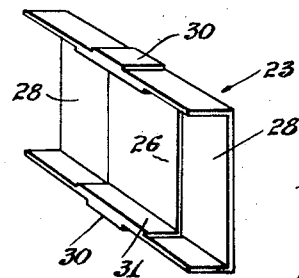
INVENTOR
Henry A. Samer Patented Aug. 15, 1944

2,356,006

UNITED STATES PATENT OFFICE 2,356,006

BUS BAR SUPPORTING CLAMP

Henry A. Samer, Ludlow, Ky., assignor to The Trumbull Electric Manufacturing Company, Plainville, Conn., a corporation of Connecticut Application April 13, 1943, Serial No. 482,858

9 Claims. (Cl. 174—99)

My invention relates to power distribution systems such as are largely used in large industrial plants and which embody enclosed ducts or housings for the multiple bus bars. These systems may employ two, three or more bus bars of the flat type which must be supported at intervals within the duct in such a way as to maintain proper relation to each other and to the walls of the duct. The duct itself for economical reasons of course should require as little metal as possible, and the entire structure should be strong enough to withstand vibration or distortion either from external forces or by reason of electrical action. The system must also be capable of convenient installation and modification when required.

I have accordingly endeavored to provide a structure to meet these requirements in a practical and satisfactory manner.

Fig. 1 is a perspective view of a fragment of a bus bar duct system showing one of the supporting clamp frames embodying my invention.

Fig. 2 is an exploded perspective view showing parts of one of the frames.

Fig. 3 is a perspective view of the outer half of an individual insulating collar or sleeve for a bus bar.

Fig. 4 is a perspective view of the inner half of the insulating sleeve for a bus bar.

The drawing shows the invention supporting twelve bus bars, each numbered 7, but it should be understood that the device may be designed to support any number—either more or less.

The preferred form of duct has two main channel-like parts 8, 9, each of which has a flange 10 on each of its opposite sides and the two parts are held together by molding strips such as 11, the edges of which embrace the adjacent flanges 10 of the main parts.

The supporting clamp frames are arranged at suitable intervals lengthwise of the duct. Each frame is formed of sheet metal with a bottom plate 12 and side bars 13, 13. The bottom plate has holes 14 for devices such as screws for fastening it to the bottom part 9 of the duct. The side bars have screw seated bosses 15 which extend between flanges 10, 10. The molding strip is secured in place by screws 16 which extend through it between the flanges and are screwed into the bosses 15. When additional rigidity is required, the side bars may be bolted to the duct at the holes 17.

The bottom plate 12 has an upstanding flange 18, and the side bars have inturned flanges 19, 19 which are welded to the flange 18 at the corners 20, 20. A cross bar 21 slotted at its ends rests on the flange 18 between the flanges 19 and indirectly supports the lower edges of the bus bars. Each bus bar is preferably enclosed in an insulating sheath such as felted asbestos 22 except at the take-off and junction points. At the places where the bus bars are supported by the clamp frames, each bus bar is preferably protected by additional insulation formed of split insulating sleeves. These sleeves are formed of molded composition, one part 23 having flanges fitting withposition in the flanges of the other part 24. The central walls 25, 26 fit snugly against the sides of the enclosed bus bar sheath but the ends 27, 28 are spaced apart somewhat from the sheath. The upper and lower flanges of the outer sleeve part 24 have grooves 29 and the inner part 23 has ribs 30 which fit in the grooves. The inner part 23 has walls 31 near the central portion which engage the upper and lower edges of the bus bar sheath. The lower flange of the sleeve part 24 has lugs 32, 32 which fit on opposite sides of the cross bar 21 to position the sleeve.

When all of the sleeves have been adjusted to their proper positions, the wedges 33, 33 are forced into place along the tapered flanges 19, 19 of the frame so as to force the bus bars toward each other and hold them snugly and prevent vibration. Each wedge has flanges 34 which overlap the tapered edges of the side bars to properly position the wedges. When the wedges are in place, the cross bar 35 is placed in position over the upper ends of the wedges and bolted to the side bars as shown in Fig. 1. The upper edge of sleeve part 24 is preferably provided with lugs 36 to coact with the edges of the cross bar 35 and assist in holding the parts in position. These insulating sleeves completely protect the bus bar sheaths and electrically shield the bus bars.

The supporting frame is practical to make and easy to assembly and provides a strong and reliable clamping means. The complete duct system is rigid and safe.

From the foregoing, it will be seen that the clamping frame is adapted to be installed in any suitable form of duct at any place along its length and that when the frame is secured to the bus bars and to the duct the entire system is reenforced against twisting or distortion and the bus bars are held in their proper positions.

I claim:

1. A bus bar supporting clamp comprising a frame having tapered side bars, wedges for coacting with said side bars and means connecting the side bars of the frame and holding the wedges in place.

2. A bus bar supporting clamp comprising a U-shaped frame having tapered guide members, wedges for coacting with said guide members to press the bus bars together and means for holding the wedges in place.

3. A bus bar supporting clamp comprising a U-shaped frame having side bars at least one of which is tapered, a wedge for coacting with said tapered side bar and means for holding said wedge in place.

4. A bus bar supporting clamp comprising a U-shaped frame having spaced side bars, at least one of which is a tapered guide member, a wedge coacting with said guide member and a cross tie member connecting the side bars of the frame and holding the wedge in place.

5. A bus bar supporting clamp comprising a U-shaped frame having tapered guide members, wedges for coacting with said guide members and a cross tie member connecting the sides of the frame and holding the wedges in place.

6. A device for supporting a plurality of bus bars in spaced relationship in a bus duct including a frame having bottom and side walls, an upstanding flange on the bottom wall, a flat support on the upper edge of the flange, a plurality of insulating telescoping sectional sleeve members on said support side by side for receiving bus bars and wedge members coacting with said side walls for forcing the sleeve sections toward each other and for clamping the bus bars therebetween.

7. A device for supporting a plurality of bus bars in spaced relationship in a bus duct including a frame having bottom and side walls, an upstanding flange on the bottom wall, a flat support on the upper edge of the flange, a plurality of insulating telescoping sectional sleeve members positioned on said support side by side for receiving bus bars, wedge members coacting with said side walls for forcing the sleeve members toward each other and for clamping the bus bars therebetween and means on the insulating sleeve members for guiding said members to proper position on the support.

8. A device for supporting a plurality of bus bars in spaced relationship in a bus duct including a frame having bottom and side walls, an upstanding flange on the bottom wall, a flat support on the upper edge of the flange, a plurality of insulating telescoping sectional sleeve members on said support side by side for receiving bus bars, wedge members coacting with said side walls for forcing the sleeve sections toward each other and for clamping the bus bars therebetween and a bar connecting the top of said side walls and positioned transversely of the top of the sleeve members for securing the wedges and sleeve members in position.

9. As an article of manufacture, an insulating sleeve for a flat bus bar comprising telescoping sectional members, each member having a wall portion and flanges at the top and bottom edges thereof, each wall having an inner central portion protruding beyond the plane of the wall, and each of the flanges of one member having an inner central portion protruding beyond the plane of the flange and forming a continuation of the central protruding portion of the wall.

HENRY A. SAMER.